United States Patent
Dundar et al.

(10) Patent No.: US 7,386,165 B2
(45) Date of Patent: Jun. 10, 2008

(54) SYSTEM AND METHOD FOR A SPARSE KERNEL EXPANSION FOR A BAYES CLASSIFIER

(75) Inventors: Murat Dundar, Malvern, PA (US); Glenn Fung, Bryn Mawr, PA (US); Jinbo Bi, Exton, PA (US); R. Bharat Rao, Berwyn, PA (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 267 days.

(21) Appl. No.: 11/049,187

(22) Filed: Feb. 2, 2005

(65) Prior Publication Data
US 2005/0197980 A1 Sep. 8, 2005

Related U.S. Application Data

(60) Provisional application No. 60/542,417, filed on Feb. 6, 2004.

(51) Int. Cl.
G06K 9/62 (2006.01)
G06K 9/00 (2006.01)
G06E 1/00 (2006.01)
G06N 3/02 (2006.01)

(52) U.S. Cl. .................. 382/155; 382/128; 382/224; 706/15

(58) Field of Classification Search ........ 382/128–132, 382/155–161, 224–228; 600/587; 706/15–44
See application file for complete search history.

(56) References Cited

U.S. PATENT DOCUMENTS

| | | | | |
|---|---|---|---|---|
| 5,050,222 A | * | 9/1991 | Lee | 382/176 |
| 5,481,269 A | * | 1/1996 | Imhoff et al. | 702/76 |
| 5,734,587 A | * | 3/1998 | Backhaus et al. | 702/25 |
| 5,734,739 A | * | 3/1998 | Sheehan et al. | 382/128 |
| 5,796,863 A | * | 8/1998 | Lyon | 382/157 |
| 5,799,100 A | * | 8/1998 | Clarke et al. | 382/132 |
| 5,835,901 A | * | 11/1998 | Duvoisin et al. | 706/19 |
| 5,930,803 A | * | 7/1999 | Becker et al. | 707/104.1 |
| 6,327,581 B1 | * | 12/2001 | Platt | 706/12 |
| 7,020,593 B2 | * | 3/2006 | Hong et al. | 706/12 |

(Continued)

OTHER PUBLICATIONS

Leave-one-out procedures for nonparametric error estimates, Fukunaga, K.; Hummels, D.M.; Pattern Analysis and Machine Intelligence, IEEE Transactions on, vol. 11, Issue 4, Apr. 1989 pp. 421-423.*

(Continued)

*Primary Examiner*—Bhavesh M. Mehta
*Assistant Examiner*—Manav Seth

(57) ABSTRACT

A method and device having instructions for analyzing input data-space by learning classifiers include choosing a candidate subset from a predetermined training data-set that is used to analyze the input data-space. Candidates are temporarily added from the candidate subset to an expansion set to generate a new kernel space for the input data-space by predetermined repeated evaluations of leave-one-out errors for the candidates added to the expansion set. This is followed by removing the candidates temporarily added to the expansion set after the leave-one-out error evaluations are performed, and selecting the candidates to be permanently added to the expansion set based on the leave-one-out errors of the candidates temporarily added to the expansion set to determine the one or more classifiers.

13 Claims, 4 Drawing Sheets

U.S. PATENT DOCUMENTS

| | | | |
|---|---|---|---|
| 7,035,467 B2* | 4/2006 | Nicponski | 382/224 |
| 2002/0010691 A1* | 1/2002 | Chen | 706/20 |
| 2005/0010445 A1* | 1/2005 | Krishnan et al. | 706/45 |
| 2007/0053563 A1* | 3/2007 | Tu et al. | 382/128 |

OTHER PUBLICATIONS

Toward an optimal supervised classifier for the analysis of hyperspectral data, Dundar, M.M.; Landgrebe, D.A.; Geoscience and Remote Sensing, IEEE Transactions on, vol. 42, Issue 1, Jan. 2004 pp. 271-277.*

Covariance matrix estimation and classification with limited training data, Hoffbeck, J.P.; Landgrebe, D.A.; Pattern Analysis and Machine Intelligence, IEEE Transactions on, vol. 18, Issue 7, Jul. 1996 pp. 763-767.*

An improved training algorithm for kernel Fisher discriminants, Mika, S.; Smola, A.; Scholkopf, B.; Proc. International Workshop on Artificial Intelligence and Statistics, Jan. 4-7, 2001, Key West, Florida.*

An introduction to kernel-based learning algorithms Muller, K.-R.; Mika, S.; Ratsch, G.; Tsuda, K.; Scholkopf, B. Neural Networks, IEEE Transactions on vol. 12, No. 2, Mar. 2001 pp. 181-198.*

Mika S et al, "An Improved Training Algorithm for Kernel Fisher Discriminants", International Workshop on Artificial Intelligence and Statistics, Jan. 4, 2001, pp. 1-7.

Smola A.J. et al, "Sparse Greedy Matrix Approximation for Machine Learning", Proceedings of the 17$^{th}$ International Conference on Machine Learning, Stanford University, CA, USA.

Williams C et al, "Using the Nyström Method to Speed Up Kernel Machines", *Advances in Neural Information Processing Systems*, vol. 13, 2001, pp. 682-688.

Franc V et al, "Greedy Algorithm for a Training Set Reduction in the Kernel Methods", *Lecture Notes in Computer Science*, Springer Verlag, New York, NY, US, vol. 2756, Aug. 25, 2003, pp. 426-433.

Schölkopf B et al, "Learning with Kernels", 2002, MIT Press, Cambridge, section 12.2.1, pp. 366-369.

Tresp V., "Scaling Kernel-Based Systems to Large Data Sets", *Data Mining and Knowledge Discovery*, vol. 5, No. 3, 2001, pp. 1-18.

International Search Report including Notification of Transmittal of the International Search Report, International Search Report, and Written Opinion of the International Searching Authority.

* cited by examiner

SYSTEM AND METHOD FOR A SPARSE KERNEL EXPANSION FOR A BAYES CLASSIFIER

CROSS-REFERENCE TO RELATED APPLICATION

This application claims the benefit of U.S. Provisional Application No. 60/542,417 filed on Feb. 6, 2004, titled as "Efficient Sparse Kernel Expansion for Bayes Classifier", entire contents of which are incorporated herein by reference.

TECHNICAL FIELD

The present invention generally relates to medical imaging and more particularly to applying mathematical techniques for detecting candidate anatomical abnormalities as shown in medical images.

DISCUSSION OF THE RELATED ART

Digital medical images are constructed using raw image data obtained from a scanner, for example, a CAT scanner, MRI, etc. Digital medical images are typically either a 2-D image made of pixel elements or a 3-D image made of volume elements ("voxels"). Such 2-D or 3-D images are processed using medical image recognition techniques to determine presence of anatomical structures such as cysts, tumors, polyps, etc.

A typical image scan generates a large amount of image data, and hence it is preferable that an automatic technique should point out anatomical features in the selected regions of an image to a doctor for further diagnosis of any disease or condition. The speed of processing image data to recognize anatomical structures is critical in medical diagnosis and hence there is a need for a faster medical image processing and recognition technique(s).

Kernel Bayes classifier is one technique that can be used for data classification and locating anatomical features in medical images. However, offline training becomes impractical for large data-sets and online classification can also be problematic for time critical tasks. The kernel concept was first applied in Support Vector Machines and has since been exploited in several sub-fields of machine learning field.

The strength of the kernel concept is that any linear algorithm, which can be carried out in terms of dot products, can be made nonlinear by substituting a dot product with a priori chosen kernel operator satisfying the Mercer theorem. Hence, complex data structures can be accommodated without sacrificing the simplicity of the classifier model. A simple linear classifier in the feature space, corresponds to a powerful classifier with highly nonlinear boundaries in the input space. The complexity of this classifier can be easily adjusted by choosing a suitable kernel function among a large class of kernels that can be used in a given application.

One area where the use of kernel concept has been heavily explored is the Bayesian domain of classification. A conventional way of dealing with a classification problem is to assume normal distributions for the data and design a Bayes classifier. A simple quadratic Discriminant can be achieved in this manner. Further simplification is possible by assuming equal covariance matrices for all classes in which case the resulting decision boundary becomes linear.

Both the quadratic and linear discriminant have proved effective in classification problems in many different disciplines. However, not all real-world data can be closely approximated by a normal model in a sufficient manner. The normal model usually lacks the flexibility and complexity required to accommodate complex data structures, e.g., data with multiple subclasses. When the generic model used to implement the Bayes rule differs from the actual model, the classification error obtained might be substantially higher than the Bayes error. Hence, there is a need for a better technique(s) in view of limitations of the normal model and the considering the popularity of the kernel concept.

SUMMARY

A method and device having instructions for analyzing input data-space by learning classifiers include choosing a candidate subset from a predetermined training data-set that is used to analyze the input data-space. Candidates are temporarily added from the candidate subset to an expansion set to generate a new kernel space for the input data-space by predetermined repeated evaluations of leave-one-out errors for the candidates added to the expansion set. The candidates temporarily added to the expansion set are removed after the leave-one-out error evaluations are performed, and the candidates that are to be permanently added to the expansion set are selected based on the leave-one-out errors of the candidates temporarily added to the expansion set to determine one or more classifiers.

Medical images can be analyzed using the classifiers to determine anatomical abnormalities.

BRIEF DESCRIPTION OF DRAWINGS

Exemplary embodiments of the present invention are described with reference to the accompanying drawings, of which.

DETAILED DESCRIPTION OF THE EXEMPLARY EMBODIMENTS

The exemplary embodiments of the present invention will be described with reference to the appended drawings.

Figure 1:
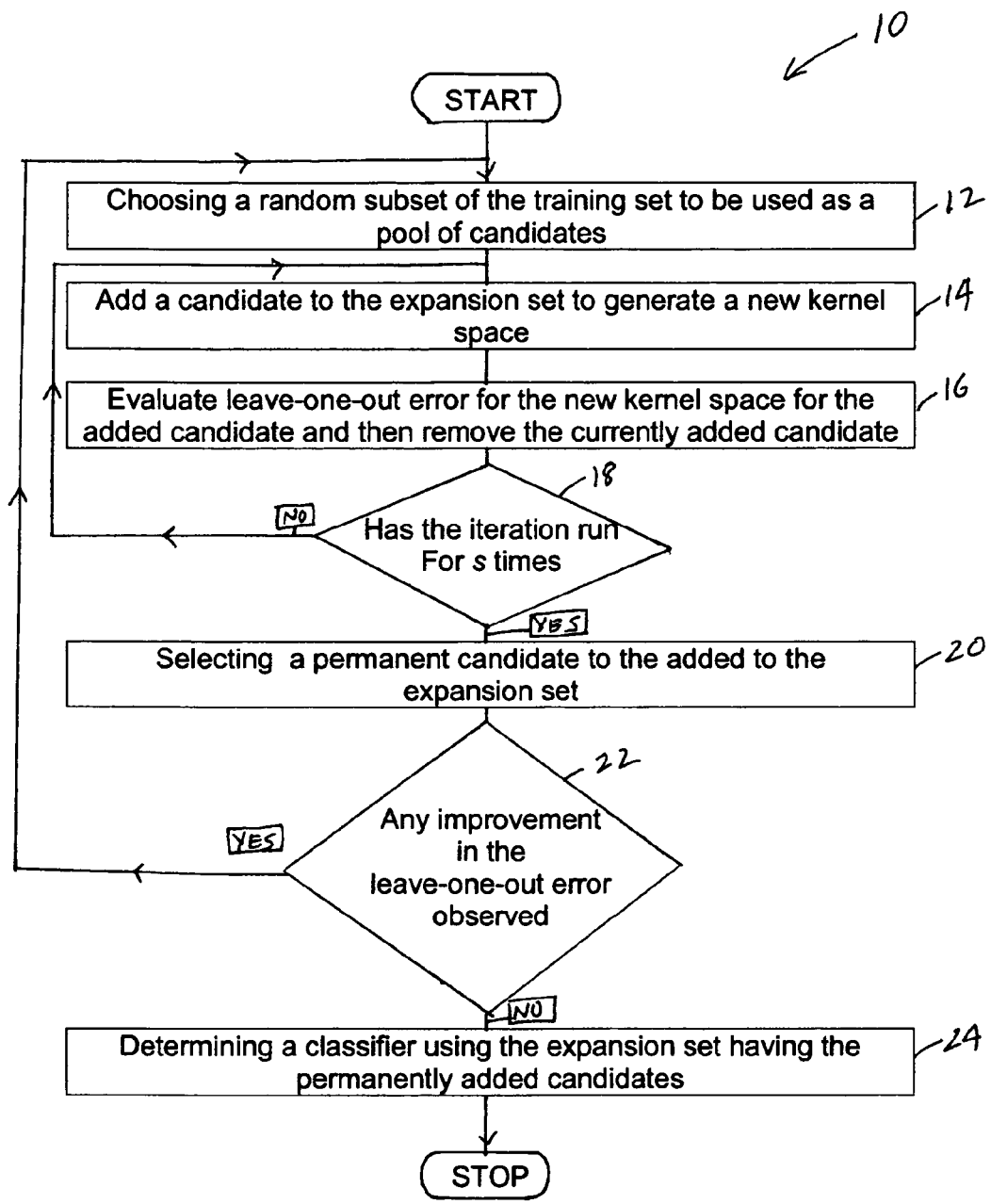
FIG. 1 is a flowchart for the sequential forward selection of the expansion samples in an exemplary embodiment of the invention.

FIG. 1 is a flowchart for the sequential forward selection of the expansion samples in an exemplary embodiment of the present invention. A single mapping function—which is called a kernel—maps a vector of inputs to another space (that may be higher-dimensional) as shown below:

$\phi: R^d \to F$, $k(x_i, x_j)$ be a kernel function and $x_i, x_j \in R^d$ such that $k(x_i, x_j) = \phi(x_i)^T \phi(x_j)$ The goal here is to learn a classifier which can detect regions of abnormalities in an image when a medical expert is viewing it. A classifier is a function that takes a given vector and maps it to a class label. For instance, a classifier could map a region of colon from a colon CT, to a label of "polyp" or "non polyp" (which could be stool, or just the colon wall). The above is an example of a binary classifier, that has just two labels—for illustration, it can be assumed that Class_1 or POSITIVE (is a polyp) or Class_2 or NEGATIVE (is not a polyp), but the same description applies to a classifier that can have many labels (e.g., polyp, stool, colon wall, air, fluid, etc.), and also it can apply to any classification problem, medical imaging being an illustration.

A classifier is trained from a training data set, which is a set of samples that have labels (i.e., the label for each sample is known, and in the case of medical imaging is typically confirmed either by expert medical opinion or via biopsy truth).

Learning a classifier using kernels is specifically considered below. The classifier is a probabilistic classifier, C, which basically (for two classes, class 1 and class 2) computes the probability that a new data point or sample (for example, a part of the colon from a new image) is either positive or negative.

$$p_j(w_j | x) = \max_k p_k(w_k | x) \rightarrow x \in w_j$$

where $p_k(W_k|x)$ denote the posterior probability of class $w_k$ given a d-dimensional vector x.

Now, using the "kernel trick", a classifier can be learned in the form of a kernel matrix, $$g_k(\phi(x)) = -(\phi(x)^T \Phi - K_k^T 1_{n_k}/n_k) A \Lambda^{-1} A^T (\Phi^T \phi(x) - K_k 1_{n_k}/n_k) + \log(\tau_k)$$

where the kernel matrix is denoted for class $w_k$ as $K_k = \Phi^T \Phi_k$ and the kernel matrix for all the samples as $K = \Phi^T \Phi$ both of which can be evaluated through the kernel function.

A problem arises because the dimensionality of the kernel matrix is the same as the number of data points in the training set. For example, in a typical medical image example, the training set can have 100,000 or more training points. This creates two immediate sub-problems. The first is the offline task, namely the training of classifier from the training set, which becomes computationally very expensive. The time and space complexity of the offline training are $O(l^3)$ and $O(l^2)$ respectively. The second sub-problem is the online task, including the use of the classifier to label a new sample, for instance, to detect abnormalities in medical images. The time required to execute the classifier, i.e., to do the computation for executing the classifier and the space complexity of the online execution are $O(l^2)$ and $O(l^2)$ respectively. This also increases with the dimensionality of the kernel matrix. Thus, even with a few thousand data points (which is far less than a typical 100,000 points) in the training set, it becomes infeasible to use such a classifier.

The various embodiments of the invention implement a method for learning such a classifier based on a fewer number of data points. Such a classifier, will not only be easier to learn (offline), but it will be efficient in the on-line mode, allowing it to be used to detect abnormalities in medical images in a reasonable amount of time.

One technique to reduce the dimensionality of the kernel matrix randomly samples a few data points from the training set and uses them to build the kernel matrix. However, this technique has drawbacks, principally, that the resulting classifier is not very accurate, because it doesn't capture the richness of the entire training data set. However, it is possible to learn more accurate classifiers by intelligently sampling data points from the training set, i.e., instead of randomly picking data points from the training set, a technique can be used for picking a small subset of data points which will produce a classifier that is more accurate than the classifier created via random sampling, and is much more efficient than a classifier training on the entire training set.

A kernel version of Fisher's Discriminant and a kernel Bayes classifier are described. Both of these approaches have been shown to be competitive with other applications. Unlike Support Vector Machines where the Discriminant function is expressed as a sparse expansion of training samples, both kernel Fisher's Discriminant and kernel Bayes classifier together with many other kernel-based techniques suffer from non-sparse formulations. That is, the solution of the decision function exists as a linear combination of all the training samples (with nonzero weights) and this leads to a kernel space having a dimensionality equal to the number of training samples. As the number of training samples, l, increases so does the dimensionality of the kernel space and the computational cost associated with the offline training of the classification algorithm. Further, the complexity of the online classification of a given sample also increases with $l^2$.

In certain online classification scenarios, classifier execution time (in contrast with the classifier training time) may be critical and this bounds the number of samples, l, that can be used to train the classifier. An efficient methodology for obtaining sparse kernel expansions within the context of kernel Bayes classifiers is discussed below. A small subset of the training samples is used, rather than the entire training set for formulating the algorithm. This approach is based on sequential forward selection of training samples for expansion, so as to optimize the leave-one-out performance of the classifier. In this approach the efficient leave-one-out formulation is derived to speed up the selection process.

Apart from the computational cost aspect, sparse formulation is also desirable for numerical stability and regularization of the classifier. Dimensionality problems can arise when estimating the statistics of the classifier in the kernel space induced by a non-sparse formulation. By pre-selecting the training samples for expansion, the dimensionality of the kernel space can be reduced and this in turn yields more robust estimates of the classifier statistics and this also acts as a regularizer on the classifier.

Next, a formulation for the Bayes classifier in the kernel space is discussed along with its relation with the Kernel Fisher Discriminant (KFD). Then, the space and time complexity of this classifier is considered. A sequential forward selection strategy for selecting the expansion samples is described. Thereafter, experimental results obtained with synthetic and real-world datasets that demonstrate the efficacy of our approach are described.

The Bayes Classifier in the Kernel Space is described next. Let $X_c = [x_1^c, \ldots, x_{l_c}^c]$ where $x_i^c \in R^d (i=1, \ldots l_c)$ be the labeled samples belonging to class $w_c$ (c=1, ... C), $l_c$ be the number of training samples in class $w_c$ and $l = \Sigma_{c=1}^C l_c$. An implicit transformation of the data into some feature space F by a nonlinear map $\phi: R^d \rightarrow F$ is disclosed. The posterior probability of class $w_c$ given $\phi$ is denoted by $p_c(w_c|\phi)$. Then the decision rule that minimizes the classification error for any given sample $\phi$ in F is given by:

$$p_j(w_j|\phi) = \max_c p_c(w_c|\phi) \rightarrow \phi \in w_j \quad (1)$$

When a normal model with equal covariance matrices for all class conditional distributions is assumed, then by Bayes rule the decision rule in Equation (1) can be transformed into:

$$g_j \phi = \max_c g_c(\phi) \rightarrow \phi \in w_j \qquad (2)$$

where, $$g_c(\phi) = -(\phi - \mu_c)^T \Sigma^{-1} (\phi - \mu_c) + \log(\tau_c) \qquad (3)$$

Let $\Phi_c = [\phi_1^c, \ldots, \phi_{l_c}^c]$ where $\phi_i^c \in F$ ($i = 1, \ldots, l_c$) be the corresponding labeled samples belonging to class $w_c$ in F, $1_{l_c}$ be an $l_c$ dimensional vector of ones, then by definition the estimates of the prior probability, the mean vector, the covariance matrix of class $W_c$ and the common covariance matrix can be expressed as:

$$\tau_c = \frac{l_c}{l} \qquad (4)$$

$$\mu_c = \frac{1}{l_c} \Phi_c 1_{l_c} \qquad (5)$$

$$S_c = \frac{1}{l_c - 1} \Phi_c \Delta \Phi_c^T \qquad (6)$$

$$\Sigma = \frac{1}{C} \sum_{c=1}^{C} S_c \qquad (7)$$

where, $$\Delta = \left( I_{l_c} - \frac{1_{l_c} 1_{l_c}^T}{l_c} \right) \left( I_{l_c} - \frac{1_{l_c} 1_{l_c}^T}{l_c} \right)^T \qquad (8)$$

and $1_{l_c}$ is a $l_c$-dimensional identity matrix. In evaluating the decision rule in (2) benefit is obtained from the kernel concept. Once the equation (3) can be expressed in the dot-product form the kernel concept can allow efficient computation of $g_c(\phi)$ for a given class $w_c$ without ever mapping the data into the feature space. The Equation (3) is not readily in the dot-product form as it requires the inverse of the common covariance matrix $\Sigma$ which is usually impractical if not impossible to compute explicitly. The pseudo inverse of this matrix can be expressed as follows:

$$\Sigma^{-1} = \frac{1}{C} \Phi \left( \sum_{c=1}^{C} \frac{1}{l_c - 1} \Phi^T \Phi_c \Delta \Phi_c^T \Phi \right)^{-1} \Phi^T \qquad (9)$$

When Equations (4), (5) and (9) are substituted into (3) the dot-product form of $g_c(\phi)$ is obtained which can be evaluated by replacing all the dot-products with a kernel function. Let $k(x, x')$ be a kernel function satisfying the Mercer theorem such that $k(x, x') = \phi(x)^T \phi(x'^-)$ then the kernel matrix for class $w_c$ is denoted as $K_c = \Phi^T \Phi_c \Phi = [\Phi_1, \ldots, \Phi_C]$ and the equation (3) is expressed terms of $K_c$ as follows:

$$g_c(k) = \qquad (10)$$

$$-\frac{1}{2}\left(k - \frac{1}{l_c} K_c 1_{l_c}\right)^T \left(\sum_{c=1}^{C} \frac{1}{l_c - 1} K_c \Delta K_c^T\right)^{-1} \left(k - \frac{1}{l_c} K_c 1_{l_c}\right) + \log\left(\frac{l_c}{l}\right)$$

where $k = \Phi^T \phi$ and $\phi$ is any sample in F. The initial problem of evaluating the discriminant function in F has now become equivalent to evaluating the discriminant function in an l-dimensional kernel space where $K_c = [k_1^c, \ldots k_{l_c}^c]$ are the labeled samples belonging to class $w_c$ and the corresponding definitions of the estimates of the mean vector and covariance matrix for class $w_c$ and the common covariance matrix are:

$$\bar{\mu}_c = \frac{1}{l_c} K_c 1_{l_c} \qquad (11)$$

$$\bar{S}_c = \frac{1}{l_c - 1} K_c \Delta K_c^T \qquad (12)$$

$$\bar{\Sigma} = \frac{1}{C} \sum_{c=1}^{C} \bar{S}_c \qquad (13)$$

Although (5), (6), (7) and hence (3) can not be computed explicitly as (11), (12), (13) and thus (10) can be evaluated and thereby for a given sample $\phi$ the value of the discriminant function for each class can be computed explicitly and the decision rule can be evaluated. Both $\bar{\mu}_c$ and $\bar{\Sigma}$ are l-dimensional parameters; a direct result of expressing the eigenvectors of $\Sigma$ in terms of linear combination of all the training samples in F as described below. When the l dimensional common covariance matrix $\bar{\Sigma}$ is estimated using only l training samples, the resultant estimate becomes numerically unstable. A common way to deal with this problem is to add some scalar times the identity matrix to this estimate. Next, the similarities between the kernel Bayes classifier technique and the kernel Fisher's discriminant are described.

When the classes are normally distributed with equal covariance matrices the discriminant obtained by the kernel Fisher's discriminant is in the same direction as the one obtained by the kernel Bayes classifier. This is verified below. For a binary classification problem the decision rule in (2) becomes:

if $d(\phi) = g_1(\phi) - g_2(\phi) > 0$ then $\phi \in w_1$ else $\phi \in w_2$ \qquad (14)

By using (10) we get $$d(\phi) = \alpha^T k + \alpha_0$$

where $$\alpha = \bar{\Sigma}^{-1}(\bar{\mu}_1 - \bar{\mu}_2)$$

$$\alpha_0 = \frac{1}{2}\left(\bar{\mu}_2^T \bar{\Sigma}^{-1} \bar{\mu}_2 - \bar{\mu}_1^T \bar{\Sigma}^{-1} \bar{\mu}_1\right) + \log\frac{l_1}{l_2}$$

$\alpha$ when normalized is equal to the kernel Fisher's Discriminant, i.e., the leading eigenvector of $\bar{\Sigma}^{-1}(\bar{\mu}_1 - \bar{\mu}_2)(\bar{\mu}_1 - \bar{\mu}_2)^T$. problem, the kernel Bayes classifier except for the bias term, $\alpha_0$ is equivalent to the kernel Fisher's discriminant.

On the other hand for the multi-class classification problems, i.e., C>2, the kernel Fisher's discriminant finds a projection from the l-dimensional kernel space to the (C−1) dimensional subspace. Then another classifier can be designed in this subspace to discriminate among classes. However, unlike the kernel Fisher's discriminant, the kernel Bayes classifier evaluates the decision rule in (2) by directly evaluating the discriminant functions $g_c(k)$ in the l-dimensional kernel space allowing multi-class classification problems to be handled more effectively.

The time and space complexity of Kernel Bayes Classifier is described next. The time and space complexity of the naive kernel Bayes classifier are $O(l^3)$ and $O(l^2)$ respectively. Unlike Support Vector Machines the discriminant function in this approach is not sparse. That is, for the naive kernel Bayes classifier all the training examples are used to expand an eigenvector in F leading to an l-dimensional kernel space. The complexity of training the classifier, i.e., estimating the common covariance matrix, is $O(l^3)$ and the space complexity of this matrix is $O(l^2)$. For large data sets the kernel approach certainly becomes impractical. A heuristic approach to deal with this problem is to limit the expansion to a subset of the training set in which case the time and space complexity reduces to $O(lm^2)$ and $O(m^2)$ respectively where m is the size of the subset. Not only does this reduce the time and space complexity of the proposed approach, but it also makes the algorithm numerically more stable because the dimensionality of the space in which the parameters are estimated is much smaller than the number of training samples available.

The time complexity of the offline training is often not time critical. What can matter in some cases is the time and space complexity of the online classification phase which are both $O(l^2)$ complex. Both of these reduce down to $O(lm^2)$ when a subset of size m of the training set is used as an expansion set. To reduce the online execution time of the classifier the size of the expansion set should be kept as small a fraction of the training set as possible, while maintaining a desired level of prediction accuracy. Hence, a sparse formulation of the kernel Bayes classifier is desirable.

Illustrative sequential forward selection of expansion samples is described next. A common but rather inefficient way to achieve this is to choose a random subset of the training samples for expansion. A fast sequential forward selection strategy to attain a sparse solution is described below. In this scheme each sample placed in the expansion set is chosen among several others as the sample generating the best leave-one-out error.

A sequential forward selection algorithmic technique is described next. An empty expansion set is a start condition and at each iteration of the algorithm the following procedure is repeated until no or negligible improvement is observed in the leave-one-out error.

Any vector in the kernel space can be "expanded" as a linear combination of all the samples in the training set. These samples can be called expansion samples and the set they belong to as an "expansion set". In kernel-based algorithms the computational complexity is mostly determined by the size of this set.

At a step 12, a random subset (of size s) of the training set is chosen. This is only necessary if the training set is too large. If the size of the training set is manageable, for example, up to few thousand samples, this step can be eliminated. This subset of the training set can be considered as a pool of potential candidates for the expansion set. The samples in this pool are ordered and starting with the first sample steps 14-16 are repeated for all the samples in the pool.

At a step 14, a candidate is temporarily added into the expansion set to generate a new kernel space (every time the expansion set changes a different kernel space is generated). When the expansion set changes all the classifier parameters evaluated in the kernel space also changes, i.e., equations (11)-(13) change. The discriminant function changes as a result of the changes in these parameters.

At step 16, in the new kernel space, the leave-one-out error of the algorithm is evaluated and recorded followed by removal of the current candidate from the expansion set. Leave-one-out error is evaluated using the below described efficient form of the discriminant function. The parameters of the classifier need not be recomputed and hence the classifier need not be retrained every time a sample is left out from the training set. This closed form leave-one-out formulation is not relatively exact. The samples in the kernel space are generated via the samples in the expansion set and the below formulation does not take this into account. However, this is not a concern because approximation will only affect the value of the discriminant function for a very small fraction of the training samples, i.e., for samples which happen to be in the expansion set. Hence, as long as the size of the expansion set is small, compared to the size of the training set this effect can be ignored.) The testing of the left-out sample is completed once d (the mahalonobis distance) is computed and plugged into equation (15).

$$g_c(k_i^{c'}) = \begin{cases} \left(\frac{l_c}{l_c-1}\right)^2 \left(\frac{d}{1-\gamma d}\right) & c' = c \\ \left(\frac{d}{1-\gamma d}\right) & c' \neq c \end{cases} \quad (15)$$

where the discriminant function for class $w_c$ when sample $k_i$ from class $w_{c'}$ is left out is denoted by $$g_c(k_i^{c'}), d = (k_i^{c'} - \bar{\mu}_c)^T G_c^{-1}(k_i^{c'} - \bar{\mu}_c),$$

$$G_c = \bar{\Sigma} + \frac{l_c - 1}{C(l_c - 2)} \bar{S}_c, \gamma = \frac{l_c}{C(l_c - 2)(l_c - 1)^2}.$$

A loop at a step 18, repeat steps 14-16 for all the samples in the candidate set, i.e., s times where s is the size of the pool of candidates.

At a step 20, a choice is made for the candidate leading to the best leave one-out error and permanently add this to the expansion set.

At a step 22, steps 12-20 are repeated until no or very little improvement in the leave-one-out error is observed.

At a step 24, the expansion set obtained is used to design the classifier.

Complexity Analysis is described next. The above algorithm is specifically designed for large training sets where the computational complexity becomes daunting. It converges to a local optimum of the leave one out error. Considering the size of the training set exhaustive sampling or other efficient search techniques such as branch and bound, is certainly not an option. With this approach implemented in at least one embodiment of the present invention, there is an obvious benefit gained in reducing the space complexity from $O(l^2)$ to $O(m^2)$.

The time complexity of the classifier training is still a concern because each iteration of the leave one out algorithm is $O(l^2 m^2)$ complex where m is the number of samples added to the expansion set. Below described are the conditions under which the proposed sequential forward selection algorithm can be preferred over the naive algorithm (all the training samples are used for expansion).

The computational complexity of the naive algorithm is $O(l^3)$ and that of the algorithm in various embodiments of the invention is $O(sl^2m^3)$. Therefore the algorithm is only beneficial when $sm^3 < l$. Under this scenario, the tradeoff between the performance of the classifier and the computational cost can be quite significant. However when the leave-one-out algorithm is expressed in an efficient way the time complexity of the leave-one-out algorithm becomes O($lm^2$) which is equal to the time complexity of the proposed classifier. In that case the above inequality becomes $sm^3<l^2$. This indicates that sufficiently large s and m values can be chosen and still a significant computation advantage over the naive algorithm can be obtained without sacrificing too much from the performance.

An efficient Leave-one-out Algorithm is described next. When implemented directly, the conventional leave-one-out technique would have to compute the inverse of the common covariance matrix for each sample in the training set, which would be quite expensive computationally. However, a significant reduction in the required computation can be achieved by writing the matrix in a form that allows the inverse to be computed efficiently. The inverse of the common covariance matrix is expressed as a function of the left-out sample. This allows computation of the final discriminant without having to compute the inverse of a large dimensional matrix for each sample in the training set. Since the discriminant function is expressed as a function of the left out sample, updating the term that involves this sample would be sufficient to compute the new value of the discriminant function. Thus, the computational complexity of the leave-one-out scheme would be the same as that of the original classifier.

A closed form leave-one-out formulation for the kernel Fisher's discriminant is conventionally known. However the conventional formulation has shown that the kernel minimum squared error and the kernel Fisher's discriminant are equivalent, except for an unimportant scalar. Because of the way the common covariance matrix is defined, this particular conventional approach is not readily adaptable to the kernel classifier approach.

The efficient leave-one-out algorithm for (10) is described next.

$$g_c(k_i^{c'}) = \begin{cases} \left(\frac{l_c}{l_c-1}\right)^2 \left(\frac{d}{1-\gamma d}\right) & c' = c \\ \left(\frac{d}{1-\gamma d}\right) & c' \neq c \end{cases} \quad (15)$$

where the discriminant function for class $w_c$ when sample $k_i$ from class $w_{c'}$ is left out is denoted by $$g_c(k_i^{c'}), d = (k_i^{c'} - \bar{\mu}_c)^T G_c^{-1} (k_i^{c'} - \bar{\mu}_c),$$
$$G_c = \bar{\Sigma} + \frac{l_c-1}{C(l_c-2)} \bar{S}_c, \gamma = \frac{l_c}{C(l_c-2)(l_c-1)^2}.$$

This closed form leave-one-out formulation is not exact. The samples in the kernel space are generated via the samples in the expansion set and the above formulation does not take this into account. To have an exact formulation every time a sample from an expansion set is left out, a new kernel space should be generated. However, this is not practical and besides this approximation will only affect the value of the discriminant function for a very small fraction of the training samples, i.e., for samples which happen to be in the expansion set. Hence as long as the size of the expansion set is small, compared to the size of the training set this effect is relatively unimportant.

The inverse of the common covariance matrix in the feature space is described next. This was referred to in the context of Equations (9) and (11-13) above. Let U contain orthonormal eigenvectors of $\Sigma$ and $\Lambda$ be a diagonal matrix with the corresponding eigenvalues in the diagonal. More specifically, $U^T U = I$ and, $$\Sigma U = U \Lambda \quad (16)$$

From the analysis of reproducing kernels, each eigenvector can be expressed as a linear combination of the training examples, i.e., $U = \Phi A$ where A is an l-dimensional matrix of scalars. Then $A^T \Phi^T \Phi A = I$ since $U^T U = I$. By definition, $$\Sigma = \frac{1}{c} \sum_{c=1}^{C} \frac{1}{l_c - 1} \Phi_c \Delta \Phi_c^T$$

where $\Delta$ is defined in (8). Substituting this into (16) and multiplying the equation by $A^T \Phi^T$ from the left-hand side yields, $$\frac{1}{C} \sum_{c=1}^{C} \frac{1}{l_c - 1} A^T \Phi^T \Phi_c \Delta \Phi_c^T \Phi A = \Lambda. \quad (17)$$

Since we can express $$\Sigma^{-1} = U \Lambda^{-1} U^T = \Phi A \Lambda^{-1} A^T \Phi^T \quad (18)$$

it suffices to find $\Lambda^{-1}$ from (17) and substitute it into (18) to obtain $$\Sigma^{-1} = \Phi \left( \frac{1}{C} \sum_{c=1}^{C} \frac{1}{l_c - 1} \Phi^T \Phi_c \Delta \Phi_c^T \Phi \right)^{-1} \Phi^T. \quad (19)$$

Illustrative experimental results in some embodiments of the invention are described next. It was described above that the computational complexity associated with the offline training and online execution of the naive kernel Bayes classifier are both proportional to the square of the size of the expansion set. Therefore, it is important to keep the size of this set as small as possible without sacrificing much from the prediction accuracy of the classifier. Throughout the experiments two methodologies for selecting the expansion set, namely random and efficient sparse expansions, are compared.

In addition to observing whether the proposed efficient sparse expansion is favorable to the random expansion or not, each experiment has a specific purpose. First, using a small benchmark dataset the effect of the size of the expansion set on the classifier performance is illustrated and it is verified that sparse formulation can act as a regularizer over the classifier and that it can yield better generalizibility compared to non-sparse formulations. Second, a challenging example with highly nonlinear between-class boundaries is chosen to demonstrate the type of problems where the efficient sparse formulation can yield significant computational advantage. Third, an experiment with a real-world 12-band multispectral data is described. When performing on-an board airborne classification of earth cover types execution speed becomes a concern. This experiment is designed to observe the tradeoff between the computational gain achieved and the prediction accuracy sacrificed in such time-sensitive classification tasks.

First experiment using at least one embodiment of the invention is described next. Ionosphere Data from UCI Repository is considered. This is a small dataset with 351 instances and 34 features. A Gaussian radial basis function is used with a fixed kernel width of 0.05 with this data. Then the dataset was randomly split as 70% training (245 instances) and 30% testing (106 instances). For random expansions varying sizes of subsets, i.e., m=[10 50 100 245] and were considered and the testing error for each case was recorded. For large values of m the common covariance matrix may become ill-conditioned. Hence a scalar times the identity matrix is added to this matrix to make the algorithm numerically more stable. This scalar is also estimated by optimizing the leave-one-out error.

For an efficient sparse expansion, the candidate set is chosen to be the entire training set, i.e., s=245. The size of the expansion set in this case is automatically determined by a stopping criterion, which in this case is a change of less than 0.05% in the leave-one-out error between two succeeding iterations. The size of the expansion set is recorded along with the corresponding testing error. This process is repeated 20 times, each time with a random test-train split.

For the random sparse kernel expansion, a random choice is made for m=[10 50 100 245] samples, and test error is recorded. Table 1 below shows the average results for 20 such trials.

TABLE 1

Ionosphere Dataset: Mean and standard deviation of testing errors obtained using random sparse expansions of varying sizes.

| M | ERR (%) | STD |
|---|---|---|
| 10 | 14.8 | 4.9 |
| 50 | 5.8 | 1.4 |
| 100 | 6.6 | 1.6 |
| 245 | 8.6 | 1.6 |

The above described efficient sparse expansion implemented in at least one embodiment of the invention here yields an average of 5.9% testing error with a standard deviation of 4.2 and the average size of the expansion set is 8.6 with a standard deviation of 1.7.

A closer look at Table 1 above reveals that sparse expansion can indeed act as a regularizer on the classifier and using more expansion samples does not necessarily improve the prediction accuracy on the test set. As discussed above, each sample added to the expansion set in turn increases the dimensionality of the kernel space by one. Although higher dimensionality usually means more flexibility and thus higher capacity for a given classifier this does not by any means imply improved performance. Apart from increasing the capacity of the classifier, higher dimensionality may sometimes trigger numerical problems making the estimates of the classifier parameters numerically less stable, a concept also known as Hughes phenomena.

When random and efficient sparse expansions with comparable sizes are compared it is observed that using comparable number of expansion samples an average of 5.9% testing error is obtained through efficient sparse expansion and an average of 14.8% testing error through random sparse expansion. In order to achieve a comparable prediction accuracy through random expansion one should randomly sample around 50 samples.

Figure 2:
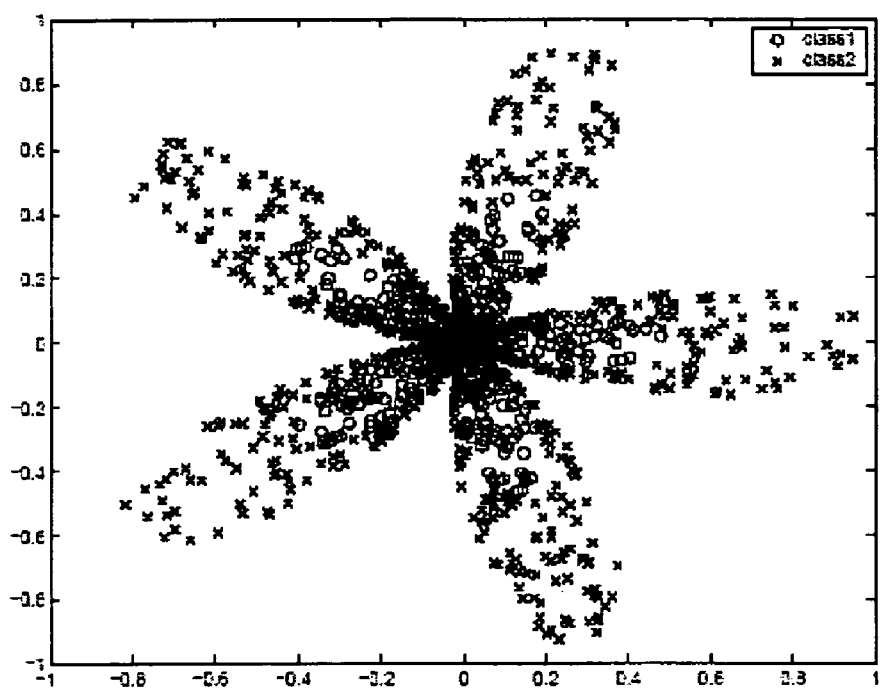
FIG. 2 shows a "flower" data-set used as an experimental data-set in an exemplary embodiment of the invention.

FIG. 2 shows a "flower" data-set used as an experimental data-set in an exemplary embodiment of the invention. This is a 2-dimensional data with two classes, 16,000 training and 4,000 testing samples. This experiment is conducted similar to Example 1 above. For random sparse expansions, the experiment is conducted in quite the same way as Example 1 except for the sizes of the expansion sets considered, m=[10 50 100 200 400 800]. Memory limitations (1 GB RAM in a given instance) do not allow going beyond 800 samples (computational complexity is $O(lm^2)$ where l=16, 000 is also very high). Table 2 shows testing errors for the above set of m values.

TABLE 2

Flower Dataset: Mean and standard deviation of testing errors obtained using random sparse expansions of varying sizes

| M | ERR (%) | STD |
|---|---|---|
| 10 | 32.8 | 1.3 |
| 50 | 23.3 | 1.6 |
| 100 | 18.6 | 0.9 |
| 200 | 15.4 | 0.8 |
| 400 | 12.8 | 0.2 |
| 600 | 10.6 | 0.2 |
| 800 | 13.1 | 0.2 |

Looking at Table 2 the regulatory effect of the size of the expansion set can again be observed on the classifier. Next, the efficient sparse expansion approach described above is used to choose an expansion set. The algorithm stopped after choosing 39 samples sequentially.

Figure 3:
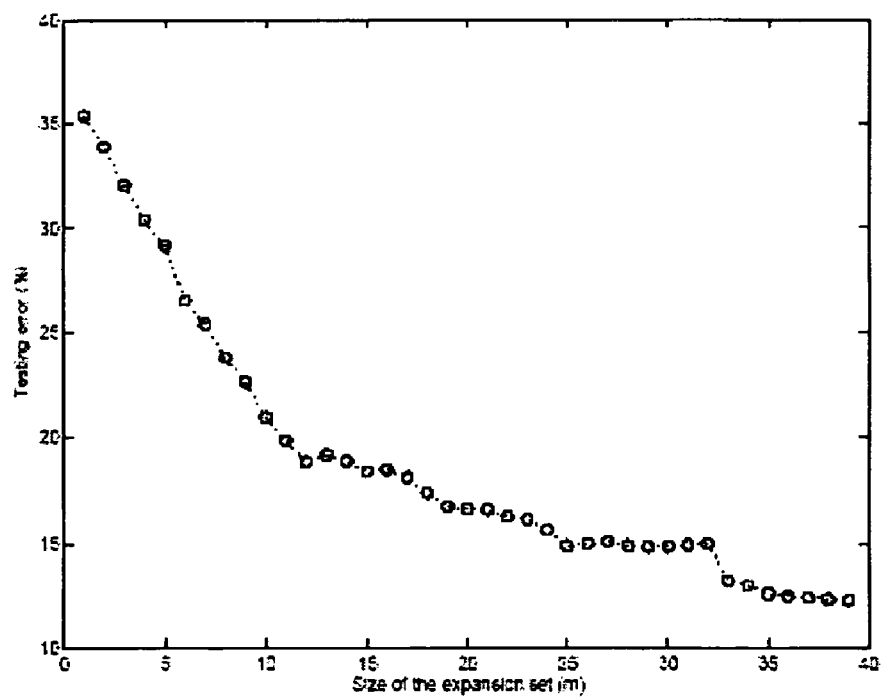
FIG. 3 shows a plot of the testing error versus the size of the expansion set in the experiment with the flower data-set in an exemplary embodiment of the invention.

FIG. 3 shows the plot of the testing error versus the size of the expansion set in the above experiment with flower data-set in an exemplary embodiment of the invention. When random and efficient sparse expansions with comparable sizes are compared, it is observed that the latter outperforms the former. Using the expansion set selected by the proposed efficient methodology a testing error of 12.3% was obtained, whereas using a random expansion of comparable size (m=50) of 23.3% testing error was obtained.

To achieve comparable performance through random expansion, an expansion set of size 400 can be used. The testing error obtained through the proposed efficient methodology is slightly worse than the best error, 10.6%, achieved using random expansion. However this is not much of a sacrifice considering the tremendous computational gain that is achieved. More specifically, the computational complexity of the online classification is $O(m^2)$ where m is the size of the expansion set. By keeping the size of the expansion set small computational cost of online classification is maintained at a reasonable level. Hence faster online execution is achievable, which is very critical in time-sensitive tasks. In this case the kernel Bayes classifier built by the expansion set obtained through the proposed efficient methodology classifies a given sample approximately 100 times faster than a classifier with a random expansion set with roughly the same degree of prediction accuracy.

Figure 4:
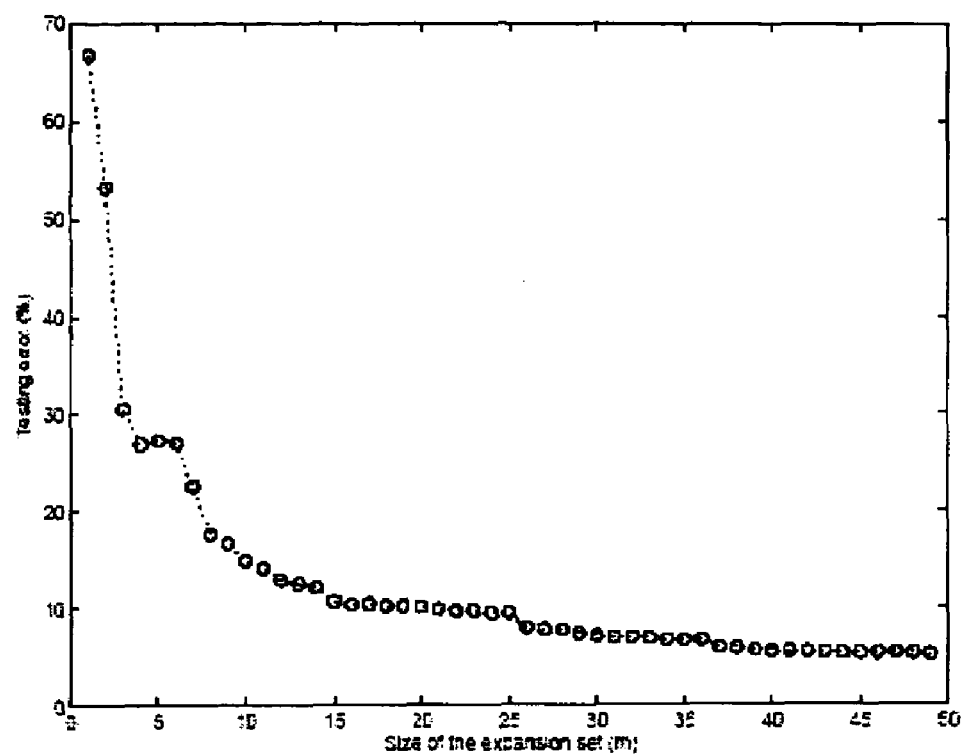
FIG. 4 shows a plot of testing error over the size of the expansion set in an embodiment of the invention for processing Flightline C1 Multi Spectral Data.

FIG. 4 is shows a plot of testing error over the size of the expansion set in an embodiment of the invention for processing Flightline C1 Multi Spectral Data. Flightline C1 (FLC1) is a historically significant data set taken from the southern part of Tippecanoe County, Indiana by the M7 scanner in June 1996. (D. A. Landgrebe, *Signal Theory Methods in Multispectral Remote Sensing*, John Wiley and Sons, 2003, pages 328-334). Although it was collected with an airborne scanner in about June 1966, the data set remains contemporary. It has several key attributes which make it valuable, especially for illustrative purposes. These are; it has a moderate number of dimensions (12 bands), it contains a significant number of ground cover classes (8 classes), and it includes many regions containing a large numbers of contiguous pixels from a given class and has ground truth available. The data set consists of 949 scan lines with 220 pixels per scan line, or 208,780 pixels of which approximately 60,000 are labeled. In this experiment a random split of the labeled samples by half into training and testing was made.

The same steps of the previous examples are repeated to estimate the classifier parameters and to obtain random and efficient sparse expansions. The testing errors for different m values are shown in Table 3 below.

TABLE 3

Flightline C1: Mean and standard deviation of testing errors obtained using random sparse expansions of varying sizes.

| M | ERR (%) | STD |
|---|---|---|
| 10 | 21.3 | 2.6 |
| 50 | 7.7 | 0.5 |
| 100 | 5.4 | 0.2 |
| 200 | 4.6 | 0.06 |
| 400 | 4.3 | 0.05 |
| 600 | 4.1 | 0.03 |

For this dataset the maximum m value that can be considered before reaching the memory limitations (1 GB here) is 600. The proposed sequential forward selection algorithm for this dataset chooses 49 samples before the stopping criterion triggered. The plot showing the testing error versus the size of the expansion set is shown in FIG. 4.

For this dataset using the expansion set selected by the proposed algorithm a testing error of 5.3% was obtained, whereas using a random expansion of comparable size (m=50) a testing error of 7.7% was obtained. In order to achieve comparable performance through random expansion an expansion set of size 100 needs to be used. The best testing error obtained through random expansion is 4.1% which is slightly better than the 5.3% testing error obtained using the proposed algorithm in an embodiment of the invention.

The stopping criterion of the proposed algorithm can be relaxed and an improved testing error can be obtained by adding more samples into the expansion set through the proposed methodology. However, considering the pattern in FIG. 4, i.e., the testing error drops down sharply with the very first few samples and very slowly thereafter, this will come at a significant computational cost.

Various embodiments of the invention can be used to detect anatomical abnormalities or conditions using various medical image scanning techniques. For example candidates can be any of a lung nodule, a polyp, a breast cancer lesion or any anatomical abnormality. Classification and prognosis can be performed for various conditions. For example, lung cancer can be classified from a Lung CAT (Computed Axial Tomography) scan, colon cancer can be classified in a Colon CAT scan, and breast cancer from a X-Ray, a Magnetic Resonance, an Ultra-Sound or a digital mammography scan. Further prognosis can be performed for lung cancer from a Lung CAT (Computed Axial Tomography) scan, colon cancer from Colon CAT scan, and breast cancer from a X-Ray, a Magnetic Resonance, an Ultra-Sound and a digital mammography scan. Those skilled in the art will appreciate that the above are illustrations of body conditions that can be determined using some exemplary embodiments of the invention.

An efficient algorithm for obtaining sparse kernel expansions within the framework of the Bayes classifier as used in various embodiments of the invention is described above. Experimental results suggest that sparse expansions has a potential to regularize the classifier while providing significant computational advantages for the offline training and online execution of the classifier. When compared to random sparse expansions, the sparse expansion methodology described here can yield similar degree of prediction accuracy using a much smaller set of expansion samples.

The techniques used in various embodiments of the invention efficiently learn a small subset of the training set; regularize the classifier and improve its generalization capability; result in a numerically more stable classifier; reduce the time complexity of the offline training; reduce the space complexity of the offline training; increase the execution speed of the algorithm in real-time environment; reduce the space complexity of the online execution; allows efficient computation of the leave-one-out performance with the Bayes classifier.

Figure 5:
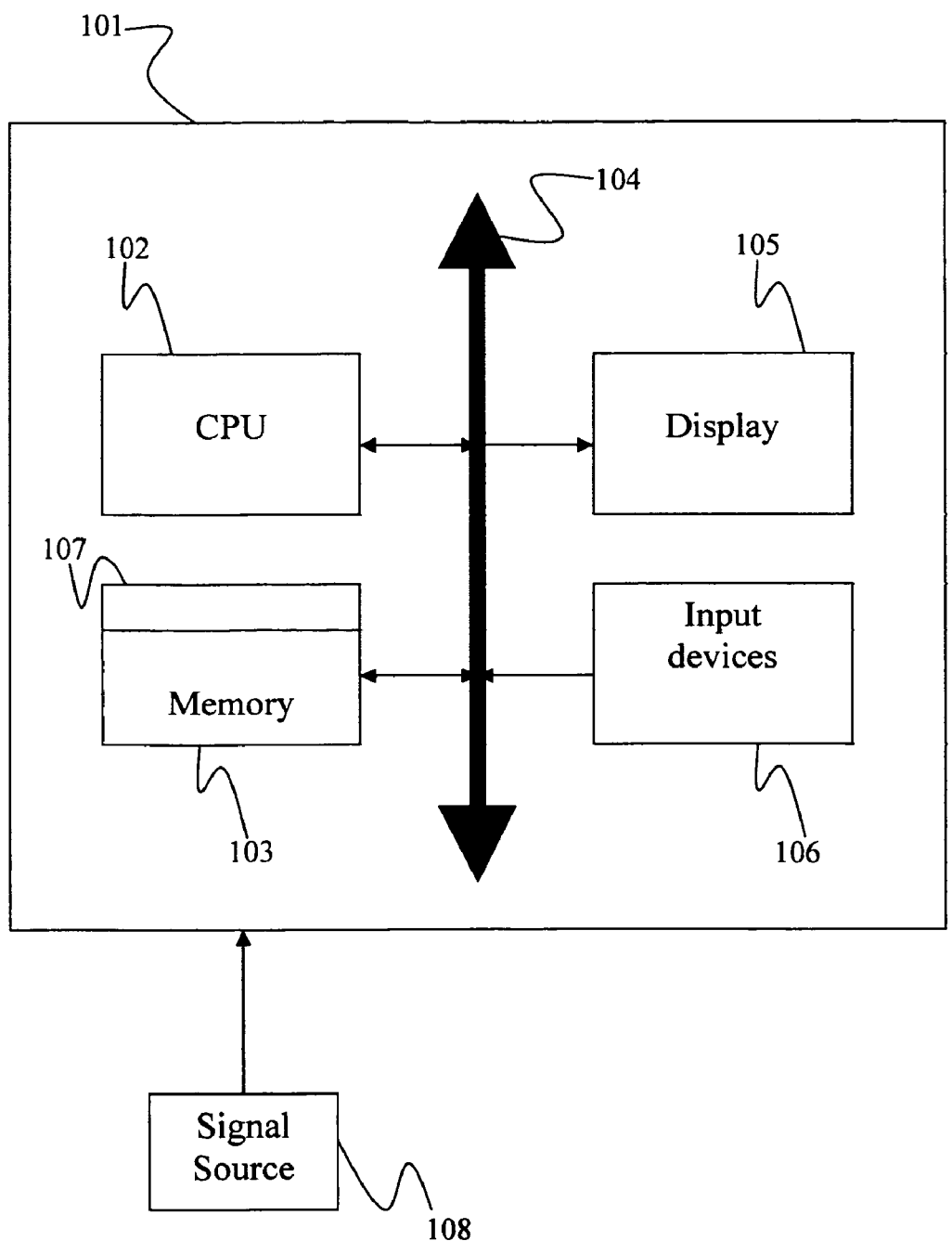
FIG. 5 is an illustrative computer system used to implement an exemplary embodiment of the invention.

Referring to FIG. 5, according to an exemplary embodiment of the present invention, a computer system 101 for implementing the invention can comprise, inter alia, a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. An exemplary embodiment of the invention can be implemented as a routine 107 that is stored in memory 103 and executed by the CPU 102 to process the signal from the signal source 108. As such, the computer system 101 is a general purpose computer system that becomes a specific purpose computer system when executing the routine 107 of the present invention in an exemplary embodiment of the invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed in an exemplary embodiment of the invention. Given the teachings of the present invention provided herein, one of ordinary skill in the related art will be able to contemplate these and similar implementations or configurations of the present invention.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method for analyzing input data-space by learning one or more classifiers, the method comprising the steps of:

selecting, iteratively, a candidate to be permanently added to an expansion set based on leave-one-out errors of candidates temporarily added to the expansion set; and determining the one or more classifiers using the candidates permanently added to the expansion set,
wherein selecting the candidate to be permanently added to the expansion set comprises,
choosing for each candidate a different random candidate subset from a predetermined training data-set that is used to analyze the input data-space, wherein the candidate subset comprising candidates;
adding, sequentially, one or more candidates temporarily from the candidate subset to the expansion set to generate a new kernel space for the input data-space by predetermined repeated evaluations of leave-one-out errors for the candidates added to the expansion set;
removing the candidates temporarily added to the expansion set after the leave-one-out error evaluations are performed.

2. The method of claim 1, wherein the steps for adding and removing the candidates temporarily to expansion set are performed for all the candidates in the candidate subset.

3. The method of claim 1, wherein the steps for adding, removing and selecting are performed till meeting a stopping criteria for the evaluated leave-one-out errors.

4. The method of claim 1, wherein the evaluation of the leave-one-out errors is performed using a modified leave-one-out error evaluation comprising the steps of:
calculating inverse of a common covariance matrix expressed as a function of the left-out sample using the formula:

$$g_c(k_i^{c'}) = \begin{cases} \left(\frac{l_c}{l_c-1}\right)^2 \left(\frac{d}{1-\gamma d}\right) & c' = c \\ \left(\frac{d}{1-\gamma d}\right) & c' \neq c. \end{cases}$$

5. A method of medical image data-space analysis, the method comprising:
choosing a candidate subset from a predetermined training data-set that is used to analyze the medical image data-space, wherein the candidate subset comprising candidates;
adding one or more candidates temporarily from the candidate subset to an expansion set to generate a new kernel space for the input data-space and calculating one or more leave-one-out errors for the candidates added to the expansion set;
removing the candidates temporarily added to the expansion set after the leave-one-out error evaluations are performed;
repeating the steps for adding and removing for one or more candidates in the candidate subset;
selecting the candidates that are to be permanently added to the expansion set based on the leave-one-out errors for the candidates temporarily added to the expansion set;
iterating the steps for choosing, adding, removing, repeating and selecting meeting a stopping criteria for the leave-one-out errors is obtained;
determining one or more classifiers using the expansion set; and
applying the one or more classifiers determined using the candidates permanently added to the expansion set to the medical image data-space to determine one or more anatomical conditions in the medical image data-space.

6. The method of claim 5, wherein the at least one of the anatomical condition is a lung nodule, a polyp, a breast cancer lesion and an anatomical abnormality.

7. The method of claim 6, further comprising the step of:
classifying at least one of a lung cancer when the image data-space is a Lung CAT (Computed Axial Tomography) scan, a colon cancer when the image data-space is a Colon CAT scan, and a breast cancer when the image data-space is at least one of a X-Ray, a Magnetic Resonance, an Ultra-Sound and a digital mammography scan.

8. The method of claim 6, further comprising the step of:
performing prognosis for at least one of lung cancer when the image data-space is a Lung CAT (Computed Axial Tomography) scan, a colon cancer when the image data-space is a Colon CAT scan, and a breast cancer when the image data-space is at least one of a X-Ray, a Magnetic Resonance, an Ultra-Sound and a digital mammography scan.

9. A computer readable medium embodying instructions executable by a processor to perform a method for analyzing image data-space, the method steps comprising:
selecting, iteratively, a candidate to be permanently added to an expansion set based on leave-one-out errors of candidates temporarily added to the expansion set; and
determining the one or more classifiers using the candidates permanently added to the expansion set,
wherein selecting the candidate to be permanently added to the expansion set comprises,
choosing for each candidate a different random candidate subset from a predetermined training data-set that is used to analyze the input data-space, wherein the candidate subset comprising candidates;
adding, sequentially, one or more candidates temporarily from the candidate subset to the expansion set to generate a new kernel space for the input data-space by predetermined repeated evaluations of leave-one-out errors for the candidates added to the expansion set;
removing the candidates temporarily added to the expansion set after the leave-one-out error evaluations are performed.

10. The method of claim 9, wherein the instructions for the steps of adding and removing the candidates temporarily to expansion set are performed for all the candidates in the candidate subset.

11. The method of claim 9, wherein the instructions for the steps of adding, removing and selecting are performed till meeting a stopping criteria for the evaluated leave-one-out errors.

12. The method of claim 9, wherein the instructions for evaluation of the leave-one-errors is performed using a modified leave-one-out error evaluation comprising the step of:
calculating inverse of a common covariance matrix expressed as a function of the left-out sample using the formula:

$$g_c(k_i^{c'}) = \begin{cases} \left(\frac{l_c}{l_c-1}\right)^2 \left(\frac{d}{1-\gamma d}\right) & c' = c \\ \left(\frac{d}{1-\gamma d}\right) & c' \neq c. \end{cases}$$

13. The method of claim 9, wherein the input data-space comprises a medical image data-space.

* * * * *